June 3, 1924.
A. R. MONACO
1,496,484
HAND SIGNAL FOR MOTOR VEHICLES
Filed July 5, 1922
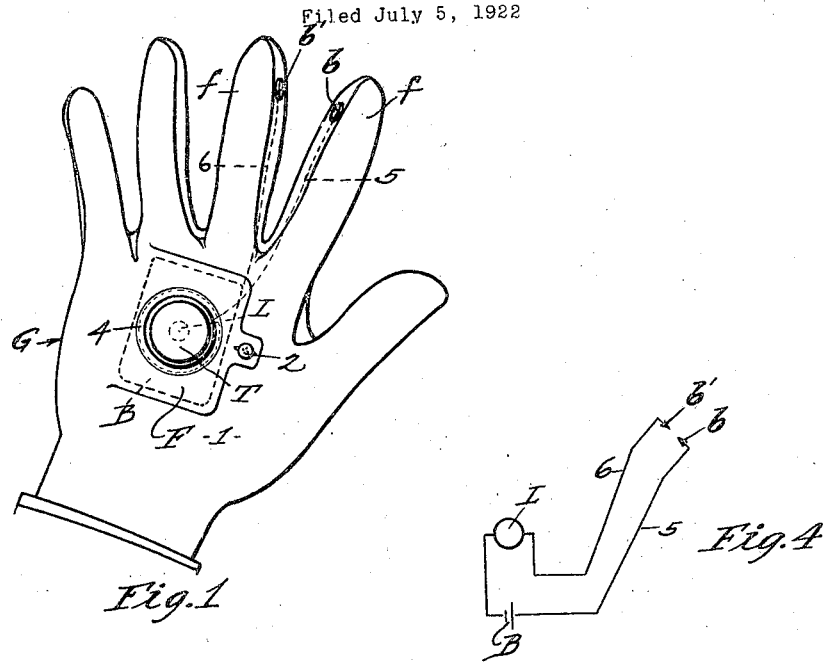
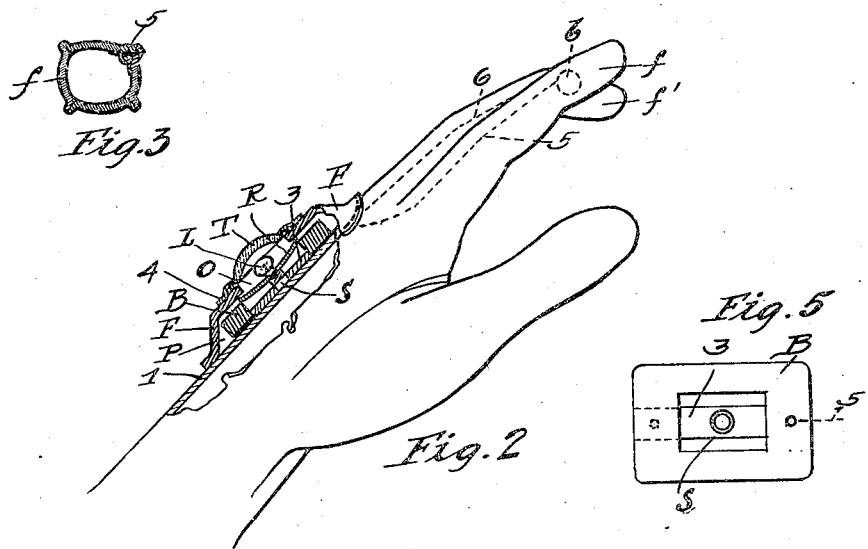
INVENTOR.
ARMAND R. MONACO,
BY
ATTORNEYS.

Patented June 3, 1924.

1,496,484

UNITED STATES PATENT OFFICE.

ARMAND R. MONACO, OF LOS ANGELES, CALIFORNIA.

HAND SIGNAL FOR MOTOR VEHICLES.

Application filed July 5, 1922. Serial No. 572,951.

*To all whom it may concern:*

Be it known that I, ARMAND R. MONACO, a citizen of the United States, and a resident of Los Angeles, in the county of Los Angeles, State of California, have invented new and useful Improvements in Hand Signals for Motor Vehicles, of which the following is a specification.

This invention relates to and has for a main object the provision of a simple, effective and convenient signal device adapted to be worn on the hand of the operator of a motor driven vehicle by means of which, when the hand is extended at the side of the vehicle, a contemplated turn or stoppage of the vehicle may be indicated to the operators of vehicles within the range of vision of the signal.

It is a further object to provide a self contained electric signal device capable of being attached to the hand of a vehicle operator, in the form of a glove or covering arranged to conveniently hold the electrical elements of the signal in operative condition, or in such other form as will be suitable and desirable.

Another object is to provide a self contained signal device including a dry cell battery and an electric light bulb of small size, together with finger operated contacts so arranged that the circuit of the light may be opened and closed by the movement of two fingers of the operator, a convenient way being to arrange the two contacts on adjacent sides of the finger coverings of the glove so that when the fingers are spread apart the light will be deenergized and when held together the light will be caused to glow.

Another object is to provide a glove specially adapted for use in connection with my improved signal device and provided with a pocket on the back or hand portion of the glove arranged to receive and detachably hold a special form of dry cell, reflector and lamp, so that both the lamp and dry cell may be replaced when necessary.

Other objects will appear as the description progresses.

I have shown one practical embodiment of my invention in the drawings accompanying this application, subject to modification within the scope of the appended claims without departing from the spirit of my invention, in which:

Fig. 1 is a perspective view of the assembled device as attached to the hand of a vehicle operator and showing particularly the back of the glove with the electrical elements mounted therein.

Fig. 2 is a perspective view of the same partly in section, as viewed from a different angle.

Fig. 3 is a cross section of one of the glove finger coverings showing how the electric conductors are held therein.

Fig. 4 is a circuit diagram of the electrical elements.

Fig. 5 is a plan view of the battery and lamp.

As shown in its preferred form, my invention includes as main elements a glove G of leather or fabric which is provided with a pocket P on the back thereof and a flap, or cover F for closing said pocket. The pocket may be formed in any suitable manner of the same material of which the glove is made, but I have shown the flap of such form as to form the pocket between the back 1 of the glove and the flap. The flap F may have a button or clasp 2 at one side thereof for holding the pocket closed and by means of which the pocket may be opened for any purpose.

Within the pocket P I provide a special form of electric dry cell battery B, of rectangular form, preferably and of minimum thickness so as to occupy as small space as possible, and the battery is designed to snugly fit the interior of the pocket so that it will not ordinarily be displaced or moved about by use. Battery B may be provided with a central contact plate 3 to which a lamp socket S may be attached for receiving an electric bulb L of small size, and a thin concave reflector R is detachably held behind the lamp L and between said lamp and socket S, as shown, for intensifying the light when the lamp L is energized.

The flap F has a central opening O in which a lens or transparent element such as colored glass T, and said element is held in position by means of a ring 4 stitched or buttoned to the flap. The first and second finger coverings $f$ and $f'$ of the glove G, or any other of the finger coverings if desired, are provided with metallic buttons $b$ and $b'$, respectively, near the outer ends thereof and on the inner and adjacent sides of the coverings $f$ and $f'$. The contact button $b$ may be connected by means of a wire 5 with one terminal of the lamp L and the other button $b'$ may be connected by means of a wire 6 with one terminal of the battery B. The opposite terminal of lamp L is connected through socket S and plate 3 with the corresponding terminal of battery B, thus completing the electrical connections of the device.

Now it will be apparent that when the buttons $b$ and $b'$ are moved into contact by the movement of finger coverings $f$ and $f'$ the circuit of the lamp L will be closed and the outer glass T will become and remain illuminated as long as this contact is maintained. Wires 5 and 6 are preferably enclosed in the coverings of finger portions $f$ and $f'$ as shown in Figs. 1 and 3, or otherwise, as may be found convenient.

When it is contemplated to change the direction of or stop the movement of a vehicle it is customary for the operator to extend his or her hand outwardly from the vehicle, and different positions of the hand are employed for indicating different directions and the stoppage of the vehicle. For instance when the hand is held straight in a substantially horizontal plane from the left hand side of the vehicle, a left hand turn is indicated, when held downwardly from either side at an angle a stop is indicated, and when upwardly at a slight angle a right hand turn is indicated. When the hand is extended from the opposite side of the vehicle the indicated turns are reversed.

Now it will be observed that it is quite impossible to see the hand of an operator at night, and frequently in daytime, when no lights are given as signals, and by the use of my improved device adapted to be worn on the hand of the operator the light may be clearly seen from the rear by the operators of oncoming vehicles, and the signals may be displayed simultaneously with the extension of the hand by pressing the fingers $f$ and $f'$ together.

I may provide my improvements in gloves or devices of suitable form especially manufactured to contain my signal elements, or the same may be quite readily mounted on and attached to ordinary driving gloves and used with equal success. I may also provide a glove of skeleton character if desirable but I deem these details immaterial to my invention in its broadest scope.

What I claim is:

1. A hand signal of the character described embodying a supporting member adapted to be worn on the hand of a person, and having a body portion encompassing the hand, a pocket formed on the back thereof, a cover for said pocket capable of being opened for affording access to the pocket, a battery held within said pocket, a lamp supported within said pocket and connected with the battery, an opening being provided in said cover, and a transparent element supported on said cover and closing said opening, for the purpose described.

2. A hand signal of the character described embodying a supporting member adapted to be worn on the hand of a person and having a body portion encompassing the hand, a pocket formed on the back thereof, a cover for said pocket capable of being opened for affording access to the pocket, a battery held within said pocket, a lamp supported within said pocket and connected with the battery, an opening being provided in said cover, a transparent element supported on said cover and closing said opening, and a reflector within said pocket and beneath said lamp.

3. A hand signal of the character described comprising a flexible supporting member adapted to be worn on and encompassing the hand of a person, a flexible member attached to the back of said supporting member and forming a pocket thereon, an opening in the outer side of said pocket, a transparent element supported over said opening, a battery within said pocket, a reflector within said pocket, and a lamp supported on said reflector, for the purpose described.

ARMAND R. MONACO.

Witnesses:
LUTHER L. MACK,
IRENE BREEN.